(12) United States Patent
Morrison et al.

(10) Patent No.: US 10,934,863 B2
(45) Date of Patent: Mar. 2, 2021

(54) TURBINE WHEEL ASSEMBLY WITH CIRCUMFERENTIAL BLADE ATTACHMENT

(71) Applicants: Rolls-Royce Corporation, Indianapolis, IN (US); Rolls-Royce North American Technologies Inc., Indianapolis, IN (US)

(72) Inventors: Daniel K. Morrison, Carmel, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 238 days.

(21) Appl. No.: 16/189,682

(22) Filed: Nov. 13, 2018

(65) Prior Publication Data

US 2020/0149422 A1    May 14, 2020

(51) Int. Cl.
*F01D 5/30*      (2006.01)

(52) U.S. Cl.
CPC .... *F01D 5/3084* (2013.01); *F05D 2300/6033* (2013.01)

(58) Field of Classification Search
CPC .... F01D 5/3069; F01D 5/3084; F01D 5/3053; F05D 2300/6033
See application file for complete search history.

(56) References Cited

U.S. PATENT DOCUMENTS

| | | | |
|---|---|---|---|
| 2,479,057 A * | 8/1949 | Bodger | F01D 5/021 416/191 |
| 3,165,294 A * | 1/1965 | Anderson | F01D 5/06 416/220 R |
| 3,311,344 A | 3/1967 | Yost | |
| 3,784,320 A | 1/1974 | Rossmann et al. | |
| 4,097,194 A * | 6/1978 | Barack | F01D 5/021 416/244 A |
| 4,102,603 A * | 7/1978 | Smith | F01D 5/021 416/229 A |
| 5,405,244 A | 4/1995 | Boyd | |
| 5,749,713 A * | 5/1998 | Heylbroeck | F23C 5/06 239/433 |
| 6,065,898 A * | 5/2000 | Hale | F16D 11/14 403/364 |
| 8,123,487 B2 | 2/2012 | Bayer et al. | |
| 8,215,919 B2 * | 7/2012 | Jewess | F01D 5/023 416/244 R |
| 8,622,708 B2 * | 1/2014 | Kusters | F01D 5/3038 416/218 |
| 8,784,064 B2 * | 7/2014 | Aschenbruck | F01D 5/06 416/207 |
| 8,814,524 B2 | 8/2014 | Krautheim | |
| 2014/0286782 A1 * | 9/2014 | Mulford | F01D 5/32 416/220 R |
| 2016/0130957 A1 | 5/2016 | Freeman et al. | |
| 2016/0186569 A1 | 6/2016 | Choi | |
| 2018/0058219 A1 * | 3/2018 | Kampka | F16D 1/076 |

FOREIGN PATENT DOCUMENTS

GB     1432875 A *   4/1976  .......... F01D 5/3069

* cited by examiner

*Primary Examiner* — Nathaniel E Wiehe
*Assistant Examiner* — Ryan C Clark
(74) *Attorney, Agent, or Firm* — Barnes & Thornburg LLP

(57) ABSTRACT

A turbine wheel assembly adapted for use in a gas turbine engine includes turbine blades made from ceramic matric composite materials.

15 Claims, 4 Drawing Sheets

TURBINE WHEEL ASSEMBLY WITH CIRCUMFERENTIAL BLADE ATTACHMENT

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. Some rotating wheel assemblies can include ceramic-containing components. Ceramic-containing components can be designed to withstand very high temperatures while also being lightweight. In view of the potential benefits of including ceramic-containing materials in rotating wheel assemblies, there is a need for further design development in this area.

SUMMARY

The present disclosure may comprise one or more of the following features and combinations thereof.

A turbine wheel assembly for use in a gas turbine engine may include a multi-piece disk, plurality of turbine blades, and a disk linkage. The disk comprises metallic materials and is configured to rotate a shaft of the engine about the central reference axis during operation of the gas turbine engine. Each of the turbine blades comprise ceramic matrix composite materials and are shaped to interact with and be rotated by the hot gases that expand as they move axially along a primary gas path of the gas turbine engine. The disk linkage is configured to couple components of the multi-piece disk together and to retain the blades in place relative to the multi-piece disk.

In some embodiments, the multi-piece disk includes a forward drum and an aft drum. The forward and aft drums of the multi-piece disk together establish a curvic coupling included in the disk linkage therebetween. The disk linkage may also include one or more tie bolts that clamp the forward drum to the aft drum.

In some embodiments, the forward drum includes a forward hub, a forward curvic portion, and a forward rim. The forward hub extends around and directly faces the central reference axis. The forward curvic portion extends radially outwardly from the forward hub. The forward rim extends radially outwardly from the forward curvic portion and provides a first radially outer portion of the disk.

In some embodiments, the aft drum includes an aft hub, an aft curvic portion, and an aft rim. The aft hub also extends around and directly faces the central reference axis. The aft curvic portion extends radially outwardly from the aft hub. The aft rim extends radially outwardly from the aft curvic portion and provides a second radially outer portion of the disk.

In some embodiments, the forward curvic portion of the forward drum engages the aft curvic portion of the aft drum to radially and circumferentially align the forward drum with the aft drum relative to the central reference axis. The engagement of the forward curvic portion and the aft curvic portion establishes the curvic coupling therebetween.

In some embodiments, together the rims of the forward and aft drums are shaped to provide a radially-outwardly opening root channel. The radially-outwardly opening root channel forms a dovetail shape when viewed circumferentially around the central axis.

These and other features of the present disclosure will become more apparent from the following description of the illustrative embodiments.

DETAILED DESCRIPTION OF THE DRAWINGS

Figure 1:
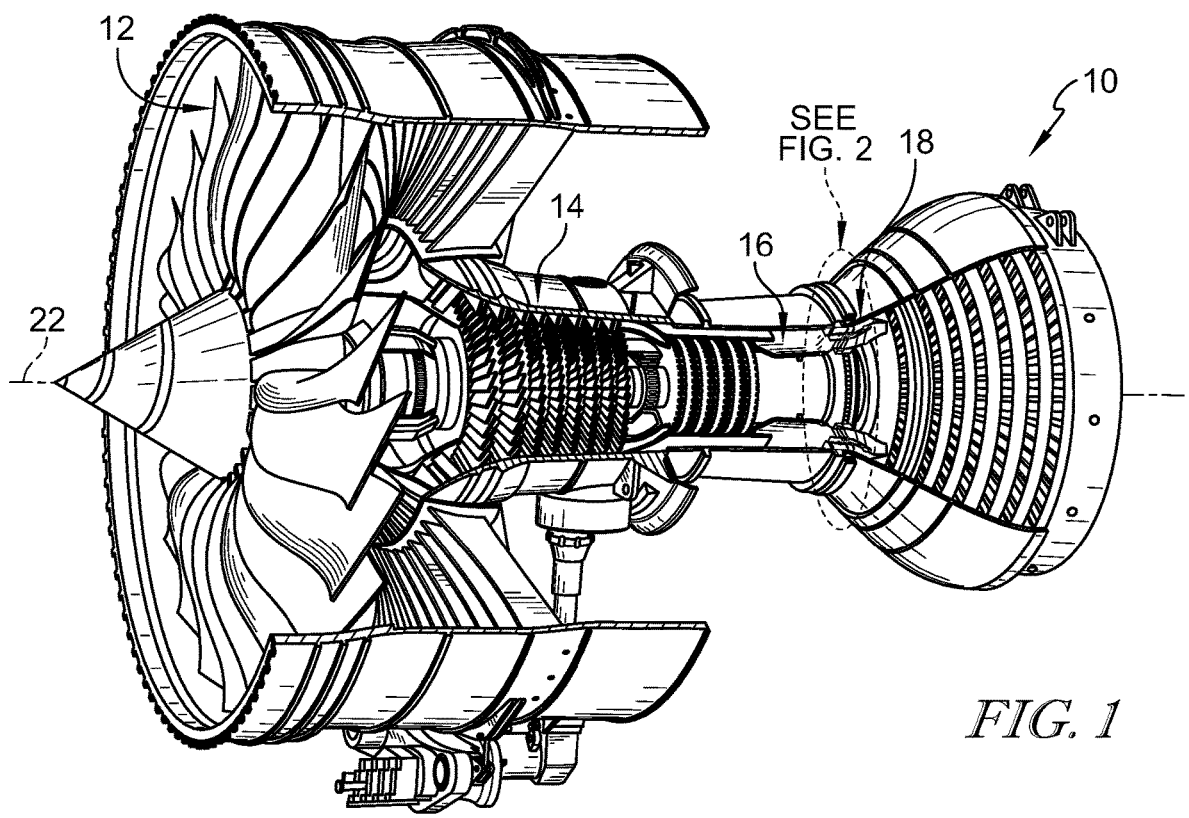
FIG. 1 is a perspective view of a gas turbine engine with a portion of the engine cut away to show that the engine includes, from left to right, a fan, a compressor, a combustor, and a turbine arranged to receive hot, high pressure combustion products from the combustor.

For the purposes of promoting an understanding of the principles of the disclosure, reference will now be made to a number of illustrative embodiments illustrated in the drawings and specific language will be used to describe the same.

Figure 2:
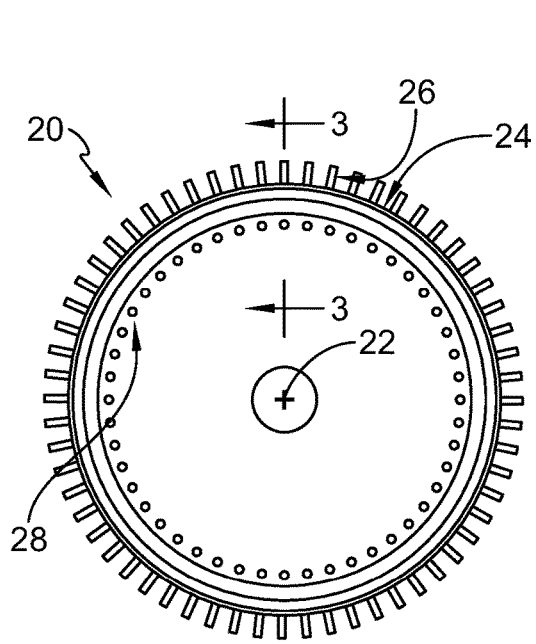
FIG. 2 is an elevation view of a turbine wheel assembly used in the turbine section of the engine of FIG. 1 showing that the turbine wheel assembly includes a disk and turbine blades mounted around an outer diameter of the disk.
Figure 3:
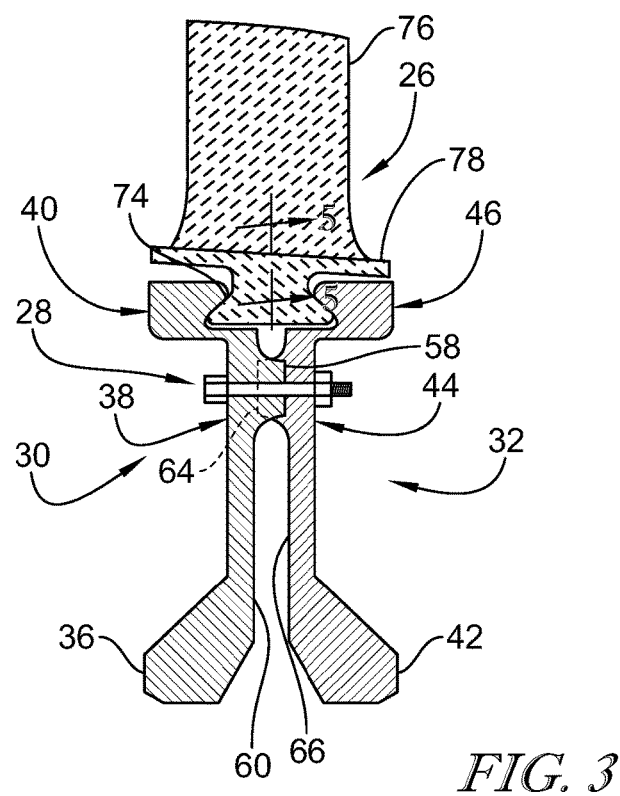
FIG. 3 is a cross-sectional detail view of the turbine wheel assembly of FIG. 2 taken at line 3-3 showing that the disk has a forward and aft drum shaped to include a dovetail rim that is shaped to form a root channel and showing the turbine wheel assembly further includes a disk linkage that fixes the forward and aft drums of the disk together when a root of one of the turbine blades is arranged in the root channel so that the turbine blade is coupled to the disk.

A turbine wheel assembly 20 according to the present disclosure is adapted for use in a gas turbine engine 10 as suggested in FIGS. 1-3. The engine 10 includes a turbofan 12, a compressor section 14, a combustor 16, and a turbine section 18 as shown in FIG. 1. The fan 12 rotates to provide thrust to an associated aircraft. The compressor section 14 draws in air and compresses it increasing pressure of the air before delivering it to the combustor 16. In the combustor 16, fuel is mixed with the pressurized air from the compressor section and is ignited to create hot high-pressure combustion products. The combustion products move out of the combustor and into the turbine section 18 where they interact with the turbine section 18 creating rotation of some turbine section 18 components that, in turn, drive rotation of the fan 12 as well as some components of the compressor section 14.

Figure 4:
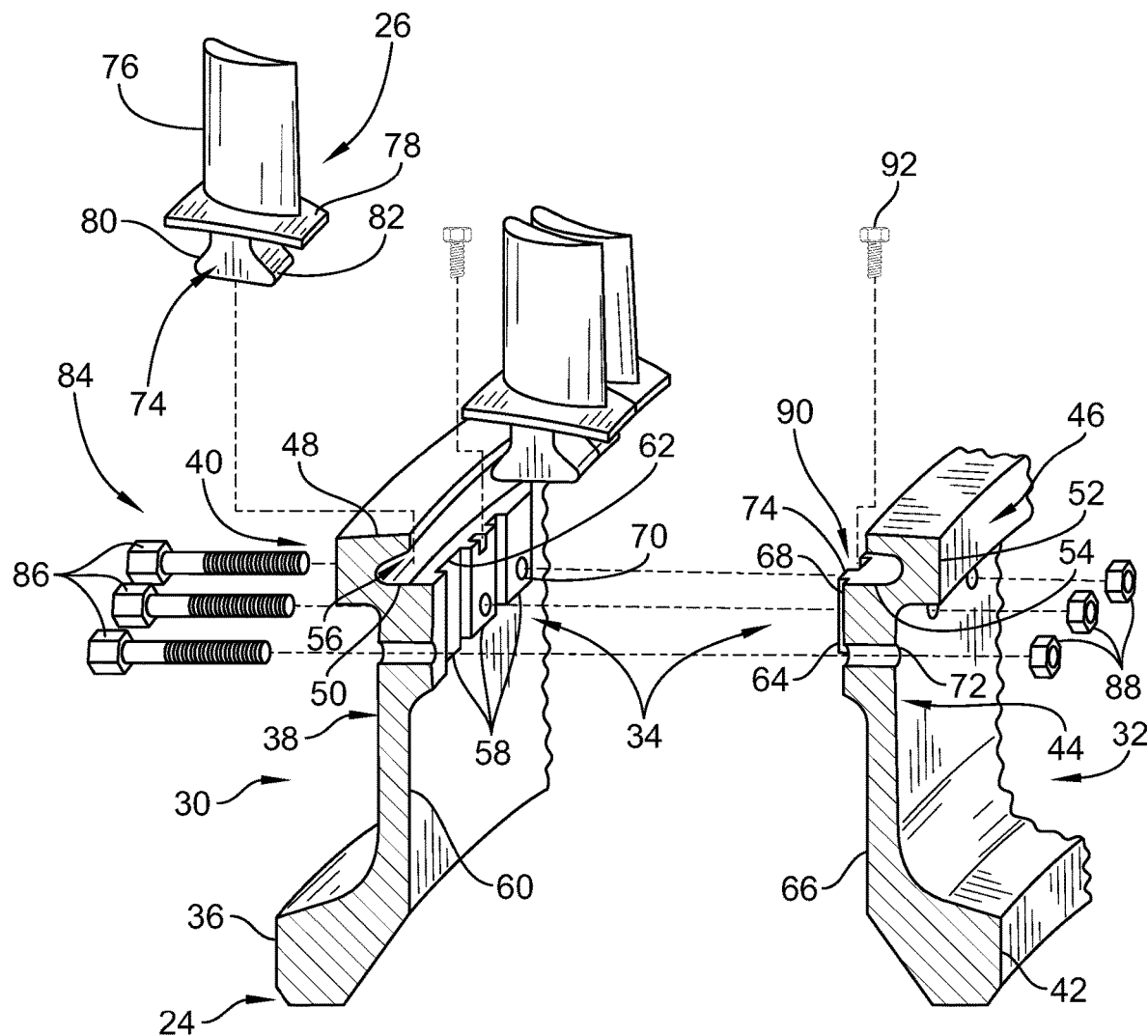
FIG. 4 is an exploded perspective view of the turbine wheel assembly of FIG. 3 showing that disk linkage includes a curvic coupling that is established between the forward and aft drums of the disk and a plurality of fasteners that extend through the forward and aft drums to provide clamping of the forward drum to the aft drum.

A first turbine wheel assembly 20 adapted for use in the turbine section 18 of the engine 10 is shown in FIGS. 2-4. The turbine wheel assembly 20 is designed to rotate about a central reference axis 22 upon interaction with expanding combustion products from the combustor 16. The turbine wheel assembly 20 includes a multi-piece disk 24, plurality of turbine blades 26, and a disk linkage 28 as shown in FIGS. 2 and 3. The disk 24 comprises metallic materials and is configured to rotate a shaft of the engine 10 about the central reference axis 22 during operation of the gas turbine engine 10. Each of the turbine blades 26 comprise ceramic matrix composite materials and are shaped to interact with and be rotated by the hot gases that expand as they move axially along a primary gas path of the gas turbine engine 10. The disk linkage 28 fixes a forward drum 30 of the disk 24 to an aft drum 32 of the disk 24 to retain the blades 26 in place relative to the disk 24.

The disk linkage 28 includes a curvic coupling 34 and a plurality of fasteners 84 as shown in FIGS. 3-4. The curvic coupling 34 is established between the forward drum 30 of the multi-piece disk 24 and the aft drum 32 of the multi-piece disk 24. The curvic coupling 34 provides radial and circumferential alignment of the forward drum 30 with the aft drum 32 relative to the central reference axis 22. The plurality of fasteners 84 extend radially from the forward drum 30 to the aft drum 32 of the multi-piece disk 24 to provide clamping of the forward drum 30 to the aft drum 32. In the illustrative embodiment, each of the plurality of fasteners 84 extends through one of a plurality of axially-rearwardly extending teeth 58 and teeth openings 68 included in the disk 24. In other embodiments, each of the plurality of fasteners 84 extends through one of a plurality of axially-forwardly extending teeth 64 and the teeth openings 62 included in the disk 24.

The multi-piece disk 24 includes a forward drum 30 and an aft drum 32 as shown in FIGS. 3 and 4. The forward drum 30 and the aft drum 32 are illustratively made from metallic super alloys designed for high-temperature use. The forward drum 30 and aft drum 32 of the disk 24 together establish the curvic coupling 34 included in the disk linkage 28 therebetween.

The forward drum 30 includes a forward hub 36, a forward curvic portion 38, and a forward rim 40 as shown in FIGS. 3 and 4. The forward hub 36 extends around and directly faces the central reference axis 22. The forward curvic portion 38 extends radially outwardly from the forward hub 36. The forward rim 40 extends radially outwardly from the forward curvic portion 38 and provides a first radially outer portion of the disk 24.

The aft drum 32 includes an aft hub 42, an aft curvic portion 44, and an aft rim 46 as shown in FIGS. 3 and 4. The aft hub 42 also extends around and directly faces the central reference axis 22. The aft curvic portion 44 extends radially outwardly from the aft hub 42. The aft rim 46 extends radially outwardly from the aft curvic portion 44 and provides a second radially outer portion of the disk 24.

In the illustrative embodiment, the forward curvic portion 38 of the forward drum 30 engages the aft curvic portion 44 of the aft drum 32 to radially and circumferentially align the forward drum 30 with the aft drum 32 relative to the central reference axis 22. The engagement of the forward curvic portion 38 and the aft curvic portion 44 establishes the curvic coupling 34 therebetween.

The forward rim 40 includes a forward retention ring 48 and a forward floor flange 50 as shown in FIG. 4. The forward retention ring 48 extends around the central axis 22. The floor flange 50 extends axially-rearwardly and away from the forward retention ring 48 relative to the central axis 22.

The aft rim 46 includes an aft retention ring 52 and an aft floor flange 54 as shown in FIG. 4. The aft retention ring 52 extends around the central axis 22. The aft floor flange 54 extends axially-fowardly and away from the aft retention ring 52 relative to the central axis 22.

Figure 5:
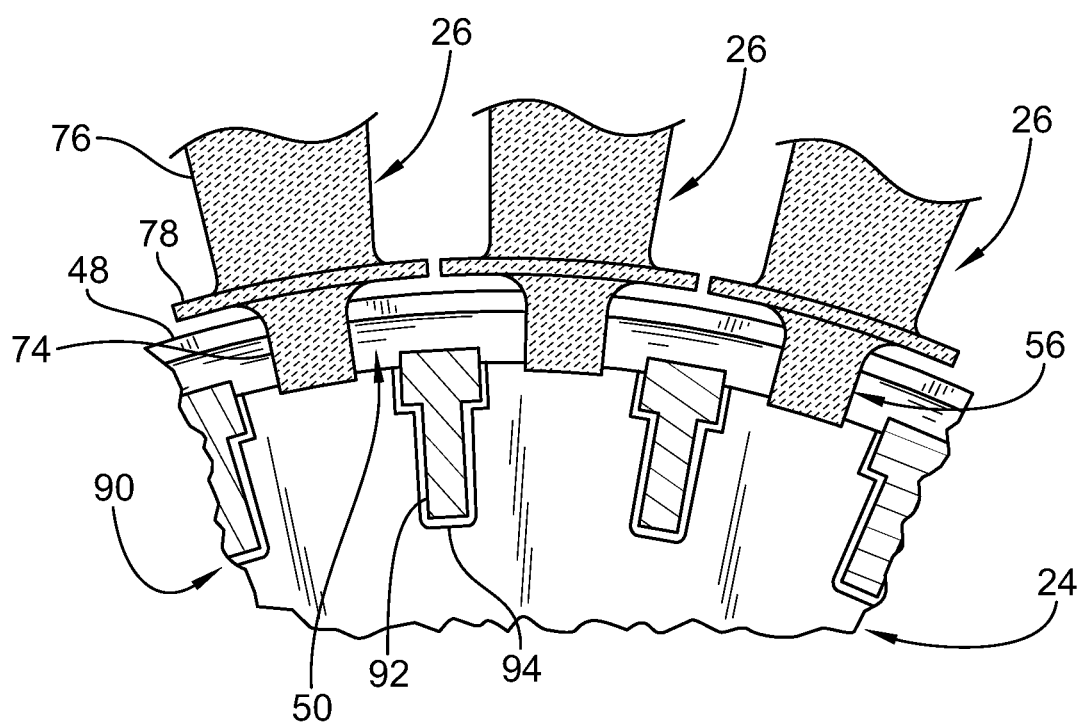
FIG. 5 is a cross-sectional detail view of turbine wheel assembly of FIG. 3 taken at line 5-5 showing that the assembly further includes an anti-rotation feature arranged in the root channel of the dovetail rim included in the disk to block movement of the turbine blades relative to the disk.

Together, the retention rings 48, 52 and the floor flanges 50, 54 of the rims 40, 46 are shaped to provide a radially-outwardly opening root channel 56 as shown in FIGS. 3-5. The radially-outwardly opening root channel 56 forms a dovetail shape when viewed circumferentially around the central axis 22. The retention rings 48, 52 block axial movement of the turbine blade 26 while the floor flanges 50, 54 block radial inward movement of the blade 26. The retention rings 48, 52 also help couple the blades 26 to the disk 24 and block radial outward movement of the blades 26 when the disk 24 rotates about the axis 22.

The forward curvic portion 38 of the disk 24 includes a plurality of axially-rearwardly extending teeth 58 as shown in FIGS. 3-5. The teeth 58 extend axially-rearwardly away from an axially inner surface 60 of the forward drum 30 of the disk 24 toward the aft drum 32. The plurality of axially-rearwardly extending teeth 58 are spaced from one another about the central reference axis to form teeth openings 62 therebetween.

The aft curvic portion 44 includes a plurality of axially-forwardly extending teeth 64 as shown in FIGS. 3-5. The teeth 64 extend axially-forwardly away from an axially inner surface 66 of the aft drum 32 of the disk 24 toward the forward drum 30. The plurality of axially-forwardly extending teeth 64 are spaced from one another about the central reference axis to form teeth openings 68 therebetween.

In the illustrative embodiment, the plurality of axially-forwardly extending teeth 64 are intermeshed with the plurality of axially-rearwardly extending teeth 58. The teeth 64 extend into the teeth openings 62 of the forward curvic portion 38 of the forward drum 30 and the teeth 58 extend in to the teeth openings 68 of the aft curvic portion 44 of the aft drum 32 to interlock the forward curvic portion 38 and the aft curvic portion 44.

In the illustrative embodiment, the forward and aft drums 30, 32 of the disk 24 further include a plurality of axially extending coupling holes 70, 72 as shown in FIG. 4. The forward drum 30 is formed to include forward axially extending coupling holes 70 that extend axially through the disk 24 and the aft drum 32 is formed to include aft axially extending coupling holes 72 that extend axially through the disk 24 and align with the coupling holes 70 formed in the forward drum 30 when the teeth 58 of the forward drum 30 are intermeshed with the teeth 64 of the aft drum 32. In the illustrative embodiment, the coupling holes 70, 72 are located at a location where the hoop stress is equal to the radial stress resulting in the multi-piece disk 24 during rotation of the assembly 20 about the central reference axis 22.

In the illustrative embodiment, the forward axially extending coupling holes 70 extend axially through the axially-rearwardly extending teeth 58 of the forward drum 30 and the aft axially extending coupling holes 72 extend axially through the teeth openings 68 of the aft drum 32. In other embodiments, the forward axially extending coupling holes 70 extend axially through the teeth openings 62 of the forward drum 30 and the aft axially extending coupling holes 72 extend axially through the axially-forwardly extending teeth 64 of the aft drum 32.

The turbine blade 26 includes a root 74, an airfoil 76, and a platform 78 as shown in FIGS. 3-5. The root 74 of each turbine blade 26 is arranged in the root channel 56 of formed by the rims 40, 44 of the multi-piece disk 24 to couple the blade 26 to the disk 24. In the illustrative embodiment, the root 74 has a dovetail shape when viewed circumferentially. The airfoil 76 extends radially away from the root 74 relative to the axis 22. The airfoil 76 is shaped to be pushed circumferentially by the hot gasses moving in the gas path to cause the turbine wheel assembly 20 to rotate about the axis 22 during operation of the gas turbine engine 10. The platform 78 extends circumferentially from the airfoil 76 to define a portion of a boundary of the gas path and block hot gasses interacting with a radially outer portion of the airfoil 76 from moving radially-inward toward the disk 24.

Illustratively, the root 74, airfoil 76, and platform 78 of each blade 26 are integrally formed such that each blade 26 is a one-piece integral component. The blade 26 comprises only ceramic matrix composite materials in the illustrative embodiment. In other embodiments, the blades 26 may comprise one or more of ceramic matrix composite materials, composite materials, and metallic materials. Due to the composite materials of the blades 26, the blades 26 may weigh less than similar sized fully-metallic blades. In other embodiments, the platforms 78 may be separate from the blades 26 or may be an offloaded platform 78 and comprise other materials such as metallic materials.

The root 74 includes a forward surface 80 and an aft surface 82 as shown in FIG. 4. The aft surface 82 is spaced apart axially from the forward surface 80. The forward and aft surfaces 80, 82 are positioned axially between the forward rim 40 and the aft rim 46 of the disk 24 to locate the root 74 in the root channel 56.

In the illustrative embodiment, the disk linkage 28 is configured to fix the forward drum 30 to the aft drum 32 of the multi-piece disk 24 when the root 74 of the turbine blade 26 is arranged in the root channel 56 of the multi-piece disk 24 so that the root 74 is retained in the root channel 56. The forward retention ring 48 of the forward rim 40 engages the forward surface 80 of the root 74 and the aft retention ring 52 of the aft rim 46 engages the aft surface 82 of the root 74 to block radially outward movement of the blade 26 away from the disk 24 relative to the central axis 22 when the forward and aft drums 30, 32 are coupled together by the disk linkage 28.

Turning again to the disk linkage 28, the curvic coupling 34 includes the forward curvic portion 38, or also referred to as the forward drum portion 38, and the aft curvic portion 44, also referred to as the aft drum portion 44 as shown in FIGS. 3 and 4. The forward drum portion 38 having the plurality of axially-rearwardly extending teeth 58 and the aft drum portion having the plurality of axially-fowardly extending teeth 64 intermeshed with the axially-rearwardly extending teeth 58 to provide the curvic coupling 34. In the illustrative embodiment, the forward drum portion 38 of the curvic coupling 34 is radially positioned between the forward hub 36 and the forward rim 40 of the forward drum 30 and the aft drum portion 44 of the curvic coupling 34 is radially positioned between the aft hub 42 and the aft rim 46.

Each of the plurality of fasteners 84 of the disk linkage 28 includes a tie bolt 86 and a nut 88 as shown in FIGS. 3 and 4. The tie bolt 86 extends through the axially extending coupling holes 70 of the forward drum 30 and the axially extending coupling holes 72 of the aft drum 32 of the multi-piece disk 24. The nut 88 is threadedly engaged with the tie bolt 86. In the illustrative embodiment, each of the tie bolts 86 extends through one of the plurality of axially-rearwardly extending teeth 58 and the teeth openings 68. In other embodiments, each of the tie bolts 86 extends through one of the plurality of axially-forwardly extending teeth 64 and the teeth openings 62. In other embodiments, each of the tie bolts 86 included in the plurality of fasteners 84 extends through the multi-piece disk 24 at a location where hoop stress is equal to radial stress resulting in the multi-piece disk 24 during rotation of the assembly 20 about the central reference axis 22. In some embodiments, only one tie bolt 86 is used.

The turbine wheel assembly further includes an anti-rotation feature 90 as shown in FIGS. 4 and 5. The anti-rotation feature 90 is arranged along the floor 50, 54 of the root channel 56 of the multi-piece disk 24. The anti-rotation feature 90 is configured to block movement of the turbine blade 26 relative to the multi-piece disk 24 about the central axis 22.

The anti-rotation feature 90 includes an anti-rotation pin 92 and an anti-rotation pin slot 94 as shown in FIGS. 4 and 5. The anti-rotation pin 92 extends radially outward from the floor 50, 54 of the root channel 56 and is configured to engage the root 74 of the turbine blade 26 to block movement of the turbine blade 26 relative to the multi-piece disk 24 about the central axis 22. The anti-rotation pin slot 94 is formed in the floor flanges 50, 54 of the rims 40, 46 of the multi-piece disk 24 into which at least a portion of the anti-rotation pin 92 extends.

Figure 6:
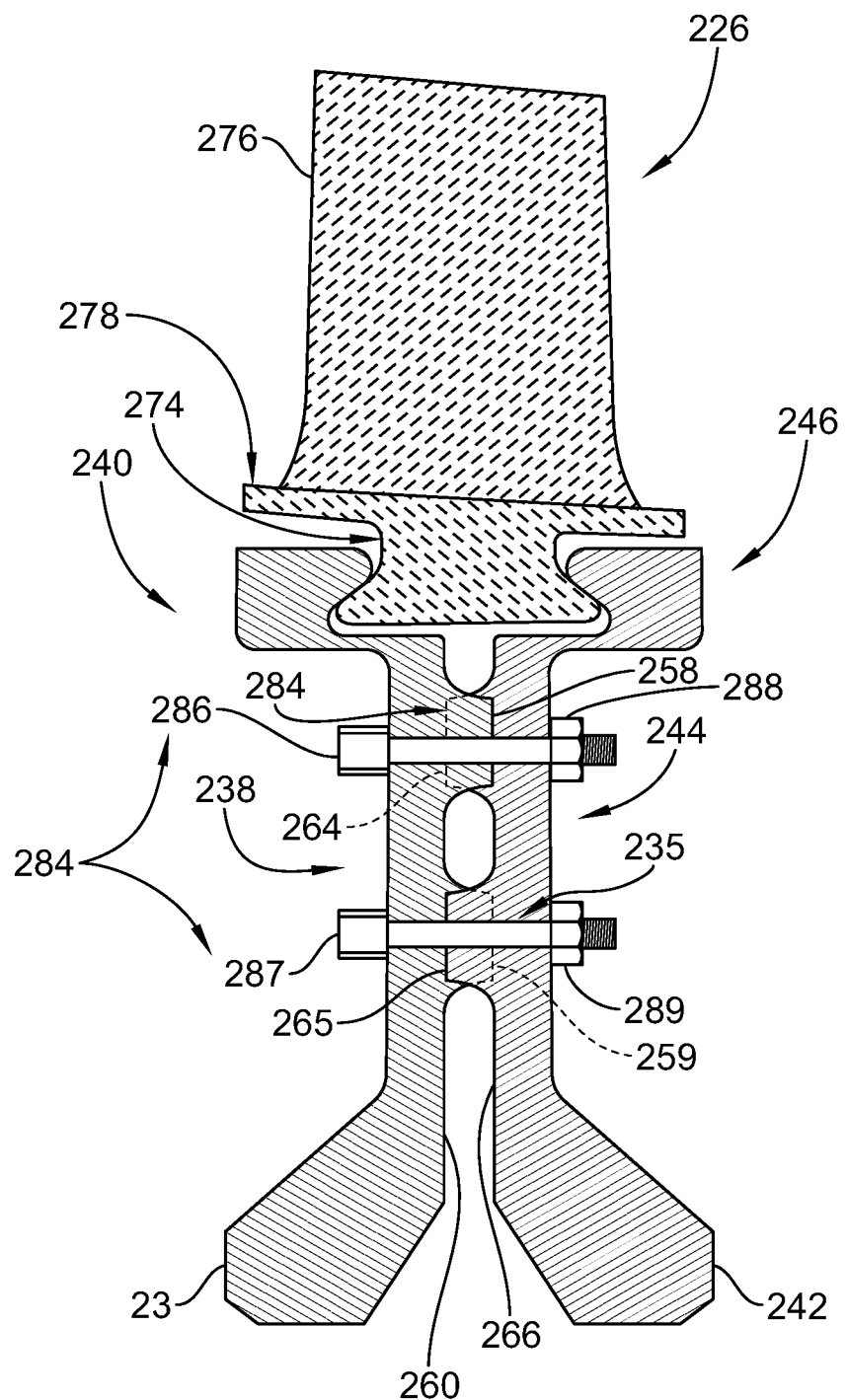
FIG. 6 is a cross-sectional detail view of a second turbine wheel assembly showing that the turbine wheel assembly includes a disk having forward and aft drums shaped to include a dovetail rim, a turbine blade including a root arranged in the dovetail rim of the disk, and a disk linkage including a plurality of curvic couplings that are established between the forward and aft drums of the disk and a plurality of fasteners that extend through the forward and aft drums to provide clamping of the forward drum to the aft drum.

A second illustrative turbine wheel assembly 220 is shown in FIG. 6. The turbine wheel assembly 220 is configured for use in the turbine section 18 of the gas turbine engine 10. The turbine wheel assembly 220 is substantially similar to the turbine wheel assembly 20 shown in FIGS. 1-5 and described herein. Accordingly, similar reference numbers in the 200 series indicated features that are common between the turbine wheel assembly 20 and the turbine wheel assembly 220. The description of the turbine wheel assembly 20 is hereby incorporated by reference to apply to the turbine wheel assembly 220, except in instances when it conflicts with the specific description of the turbine wheel assembly 220.

The turbine wheel assembly 220 includes a multi-piece disk 224, plurality of turbine blades 226, and a disk linkage 228 as shown in FIG. 6. The disk 224 comprises metallic materials and is configured to rotate a shaft of the engine 10 about the central reference axis 22 during operation of the gas turbine engine 10. Each of the turbine blades 226 comprise ceramic matrix composite materials and are shaped to interact with and be rotated by the hot gases that expand as they move axially along a primary gas path of the gas turbine engine 10. The disk linkage 228 fixes a forward drum 230 of the disk 224 to an aft drum 232 of the disk 224 to retain the blades 226 in place relative to the disk 224.

The disk linkage 228 includes a first curvic coupling 234, a second curvic coupling 235, and a plurality of fasteners 284 as shown in FIG. 6. The curvic couplings 234, 235 are established between the forward drum 230 of the multi-piece disk 224 and the aft drum 232 of the multi-piece disk 224. The curvic couplings 234, 235 provide radial and circumferential alignment of the forward drum 230 with the aft drum 232 relative to the central reference axis 22. The plurality of fasteners 284 extend radially from the forward drum 230 to the aft drum 232 of the multi-piece disk 224 to provide clamping of the forward drum 230 to the aft drum 232. In the illustrative embodiment, each of the plurality of fasteners 284 extends through one of a plurality of axially-rearwardly extending teeth 258, 259 included in the forward drum 230 and teeth openings of the aft drum 232 included in the disk 224. In other embodiments, each of the plurality of fasteners 284 extends through one of a plurality of axially-forwardly extending teeth 264, 265 included in the aft drum 232 and the teeth openings of the forward drum 230 included in the disk 224.

The multi-piece disk 224 includes a forward drum 230 and an aft drum 232 as shown in FIG. 6. The forward drum 230 and the aft drum 232 are illustratively made from metallic super alloys designed for high-temperature use. The forward drum 230 and aft drum 232 of the disk 224 together establish a curvic coupling 234 included in the disk linkage 228 therebetween.

The forward drum 230 includes a forward hub 236, a forward curvic portion 238, and a forward rim 240 as shown in FIG. 6. The forward hub 236 extends around and directly faces the central reference axis 22. The forward curvic portion 238 extends radially outwardly from the forward hub 236. The forward rim 240 extends radially outwardly from the forward curvic portion 238 and provides a first radially outer portion of the disk 224.

The aft drum 232 includes an aft hub 242, an aft curvic portion 244, and an aft rim 246 as shown in FIG. 6. The aft hub 242 also extends around and directly faces the central reference axis 22. The aft curvic portion 244 extends radially outwardly from the aft hub 242. The aft rim 246 extends radially outwardly from the aft curvic portion 244 and provides a second radially outer portion of the disk 224.

In the illustrative embodiment, the forward curvic portion 238 of the forward drum 230 engages the aft curvic portion 244 of the aft drum 232 to radially and circumferentially align the forward drum 230 with the aft drum 232 relative to the central reference axis 22. The engagement of the forward curvic portion 238 and the aft curvic portion 244 establishes the curvic couplings 234, 235 therebetween.

The forward curvic portion 238 of the disk 224 includes a first plurality of axially-rearwardly extending teeth 258 and a second plurality of axially-rearwardly extending teeth 259 as shown in FIG. 6. The second axially-rearwardly extending teeth 259 are spaced radially inward of the first plurality of the axially-rearwardly extending teeth 258. The teeth 258, 259 extend axially-rearwardly away from an axially inner surface 260 of the forward drum 230 of the disk 224 toward the aft drum 232. Each set of teeth 258, 259 are spaced from one another about the central reference axis 22 to form teeth openings in the forward drum 230 therebetween.

The aft curvic portion 244 includes a first plurality of axially-forwardly extending teeth 264 and a second plurality of axially-forwardly extending teeth 265 as shown in FIG. 6. The second axially-forwardly extending teeth 265 are spaced radially inward of the first plurality of the axially-forwardly extending teeth 264. The teeth 264, 265 extend axially-forwardly away from an axially inner surface 266 of the aft drum 232 of the disk 224 toward the forward drum 230. Each set of teeth 264, 265 are spaced from one another about the central reference axis 22 to form teeth openings in the aft drum 232 therebetween.

In the illustrative embodiment, the first plurality of axially-forwardly extending teeth 264 are intermeshed with the first plurality of axially-rearwardly extending teeth 258. The teeth 264 extend into the teeth openings of the forward curvic portion 238 of the forward drum 230 and the teeth 258 extend in to the teeth openings of the aft curvic portion 244 of the aft drum 232 to interlock the forward curvic portion 238 and the aft curvic portion 244.

In the illustrative embodiment, the second plurality of axially-forwardly extending teeth 265 are intermeshed with the second plurality of axially-rearwardly extending teeth 259. The teeth 265 extend into the teeth openings of the forward curvic portion 238 of the forward drum 230 and the teeth 259 extend in to the teeth openings of the aft curvic portion 244 of the aft drum 232 to interlock the forward curvic portion 238 and the aft curvic portion 244.

In the illustrative embodiment, the forward and aft drums 230, 232 of the disk 224 further include a plurality of axially extending coupling holes 270, 271, 272, 273 as shown in FIG. 6. The forward drum 230 is formed to include forward axially extending coupling holes 270 that extend axially through the disk 224 and the aft drum 232 is formed to include aft axially extending coupling holes 272 that extend axially through the disk 224 and align with the coupling holes 270 formed in the forward drum 230 when the teeth 258 of the forward drum 230 are intermeshed with the teeth 264 of the aft drum 232. The forward drum 230 is also formed to include forward axially extending coupling holes 271 that extend axially through the disk 224 and the aft drum 232 is formed to include aft axially extending coupling holes 273 that extend axially through the disk 224 and align with the coupling holes 272 formed in the forward drum 230 when the teeth 259 of the forward drum 230 are intermeshed with the teeth 265 of the aft drum 232. The coupling holes 270, 271, 272, 273 are located at a location where the hoop stress is equal to the radial stress resulting in the multi-piece disk 224 during rotation of the assembly 220 about the central reference axis 22.

In the illustrative embodiment, the forward axially extending coupling holes 270, 271 extend axially through the axially-rearwardly extending teeth 258, 259 of the forward drum 230 and the aft axially extending coupling holes 272, 273 extend axially through the teeth openings of the aft drum 232. In other embodiments, the forward axially extending coupling holes 270, 271 extend axially through the teeth openings of the forward drum 230 and the aft axially extending coupling holes 272, 273 extend axially through the axially-forwardly extending teeth 264, 265 of the aft drum 232.

In the illustrative embodiment, the disk linkage 228 is configured to fix the forward drum 230 to the aft drum 232 of the multi-piece disk 224 when the root 274 of the turbine blade 226 is arranged in the root channel 256 of the multi-piece disk 224 so that the root 274 is retained in the root channel 256.

Turning again to the disk linkage 228, the curvic couplings 234, 235 include the forward curvic portion 238, or also referred to as the forward drum portion 238, and the aft curvic portion 244, also referred to as the aft drum portion 244 as shown in FIG. 6. The forward drum portion 238 having the plurality of axially-rearwardly extending teeth 258, 259 and the aft drum portion 244 having the plurality of axially-fowardly extending teeth 264, 265. The plurality of axially-fowardly extending teeth 264 are intermeshed with the axially-rearwardly extending teeth 258, to provide the curvic coupling 234. Additionally, the plurality of axially-fowardly extending teeth 265 are intermeshed with the axially-rearwardly extending teeth 259, to provide the curvic coupling 235.

Each of the plurality of fasteners 284 of the disk linkage 228 includes a tie bolt 286, 287 and a nut 288, 289 as shown in FIG. 6. The tie bolt 286 extends through the axially extending coupling holes 270 of the forward drum 230 and the axially extending coupling holes 272 of the aft drum 232 of the multi-piece disk 224. The tie bolt 287 extends through the axially extending coupling holes 271 of the forward drum 230 and the axially extending coupling holes 273 of the aft drum 232 of the multi-piece disk 224. The nut 288, 289 is threadedly engaged with the tie bolt 286, 287.

In the illustrative embodiment, each of the tie bolts 286 extends through one of the plurality of axially-rearwardly extending teeth 258 and the teeth openings of the aft drum 232. Additionally, each of the tie bolts 287 extends through one of the plurality of axially-rearwardly extending teach 259 and the teeth openings of the aft drum 232.

In other embodiments, each of the tie bolts 286 extends through one of the plurality of axially-fowardly extending teeth 264 and the teeth openings of the forward drum 230. Additionally, each of the tie bolts 287 extends through one of the plurality of axially-fowardly extending teeth 265 and the teeth openings of the forward drum 230. In other embodiments, each of the tie bolts 286, 287 included in the plurality of fasteners 284 extends through the multi-piece disk 224 at a location where hoop stress is equal to radial stress resulting in the multi-piece disk 224 during rotation of the assembly 220 about the central reference axis 22.

The present disclosure discloses a turbine wheel assembly which enables the use of ceramic matrix composite materials in high pressure turbines in high performance, i.e. high speed, high temperature, and high overall pressure ration, gas turbine engines. Ceramic matrix composite turbine blades present unique design challenges as the material capabilities are significantly reduced compared to single-crystal, nickel-based alloys. As such, geometries and features not typically found in production turbine disks are required.

The present disclosure identifies an embodiment which enables the use of circumferentially attaching ceramic matrix composite turbine blades to a turbine disk. The embodiment uses a pair of separable turbine disks, attached together by several tie bolts, clamped through a curvic coupling between the two separable disks. The separable nature of the disk permits the blades to be assembled without the use of loading or defended slots typically used in circumferential compressor disks. The tie bolts clamp the two pieces of the disk together and work across the curvic pitch line which leads to a simple and stable clamp loop. The anti-rotation feature or pins are clamped between the two slots in the separable disk and retained radially by the disk flanks. The anti-rotation slots are the only feature that will concentrate hoop stress in the bottom of the dovetail slot.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly adapted for rotation about a central reference axis within a gas turbine engine, the assembly comprising
   a multi-piece disk made of metallic materials, the multi-piece disk including a forward drum and an aft drum, each of the forward drum and the aft drum having a hub that extends around the central reference axis and a rim that provides a radially-outer portion of the multi-piece disk, the rim of the forward drum and the rim of the aft drum shaped to provide a radially-outwardly opening root channel that forms a dovetail shape when viewed circumferentially around the central reference axis,
   a turbine blade made of ceramic matrix composite materials, the turbine blade shaped to include a root having a dovetail shape that is arranged in the root channel of the multi-piece disk to couple the turbine blade to the multi-piece disk and an airfoil arranged radially outward of the multi-piece disk, and
   a disk linkage configured to fix the forward drum to the aft drum of the multi-piece disk when the root of the turbine blade is arranged in the root channel of the multi-piece disk so that the root is retained in the root channel, the disk linkage including (i) a curvic coupling having a plurality of axially-rearwardly extending teeth in the forward drum and a plurality of axially-forwardly extending teeth in the aft drum intermeshed with the plurality of axially-rearwardly extending teeth to provide radial and circumferential alignment of the forward drum with the aft drum relative to the central reference axis and (ii) a plurality of fasteners that extend radially from the forward drum to the aft drum of the multi-piece disk to provide clamping of the forward drum to the aft drum,
   wherein each of the plurality of fasteners extends through one of the plurality of axially-rearwardly extending teeth or one of the plurality of axially-forwardly extending teeth; further comprising an anti-rotation feature arranged along a floor of the root channel of the multi-piece disk that is configured to block movement of the turbine blade relative to the multi-piece disk about the central reference axis and the anti-rotation feature extends radially into at least one of the plurality of axially-rearwardly extending teeth or the plurality of axially-forwardly extending teeth.

2. The assembly of claim 1, wherein the forward drum portion of the coupling is radially positioned between the hub and the rim of the forward drum, and the aft drum portion of the coupling is radially positioned between the hub and the rim of the aft drum.

3. The assembly of claim 1, wherein each of the plurality of fasteners includes a tie bolt that extends through the multi-piece disk and a nut threadedly engaged with the tie bolt.

4. The assembly of claim 3, wherein the coupling is located radially between the hub of the forward drum and the rim of the forward drum, and the coupling is located radially between the hub of the aft drum and the rim of the aft drum.

5. The assembly of claim 3, wherein each tie bolt included in the plurality of fasteners extends through the forward drum at a location in the multi-piece disk where hoop stress is equal to radial stress resulting in the multi-piece disk during rotation of the assembly about the central reference axis.

6. The assembly of claim 1, wherein the anti-rotation feature includes an anti-rotation pin that extends radially outward from the floor of the root channel and is configured to engage the root of the turbine blade to block movement of the turbine blade relative to the multi-piece disk about the central reference axis and an anti-rotation pin slot formed in the multi-piece disk into which at least a portion of the anti-rotation pin extends and the anti-rotation pin slot is defined by the at least one of the plurality of axially-rearwardly extending teeth or the plurality of axially-forwardly extending teeth.

7. The assembly of claim 6, wherein the anti-rotation pin engages a circumferential face of the root of the turbine blade.

8. A turbine wheel assembly adapted for rotation about a central reference axis within a gas turbine engine, the assembly comprising
a multi-piece disk made of metallic materials, the multi-piece disk including a forward drum and an aft drum, each of the forward drum and the aft drum having (i) a hub that extends around and directly faces the central reference axis, (ii) a coupling portion having a plurality of axially-rearwardly extending teeth in the forward drum and a plurality of axially-forwardly extending teeth in the aft drum intermeshed with the plurality of axially-rearwardly extending teeth, and (iii) a rim that extends radially outwardly from the coupling portion, wherein the coupling portion of the forward drum engages the coupling portion of the aft drum to radially and circumferentially align the forward drum with the aft drum, and wherein the rim of the forward drum and the rim of the aft drum are shaped to provide a root channel that forms a dovetail shape when viewed circumferentially around the central reference axis,
a turbine blade made of ceramic matrix composite materials, the turbine blade shaped to include a root having a dovetail shape that is arranged in the root channel of the multi-piece disk,
at least one tie bolt that clamps the forward drum of the multi-piece disk to the aft drum of the multi-piece disk to axially retain the coupling portion of the forward drum relative to the coupling portion of the aft drum so that a coupling between components of the multi-piece disk is established, and
an anti-rotation feature arranged along a floor of the root channel configured to block movement of the turbine blade relative to the multi-piece disk about the central reference axis and the anti-rotation feature extends into at least one of the plurality of axially-rearwardly extending teeth or the plurality of axially-forwardly extending teeth.

9. The assembly of claim 8, wherein the at least one tie bolt includes a plurality of tie bolts circumferentially spaced from one another about the central reference axis.

10. The assembly of claim 9, wherein each tie bolt included in the plurality of tie bolts extends through the forward drum and aft drum at a location in the multi-piece disk where hoop stress is equal to radial stress resulting in the multi-piece disk during rotation of the assembly about the central reference axis.

11. The assembly of claim 9, wherein the plurality of tie bolts extend through the coupling portion of the forward drum and the coupling portion of the aft drum.

12. The assembly of claim 11, wherein each of the plurality of tie bolts extends through one of the plurality of axially-rearwardly extending teeth or one of the plurality of axially-forwardly extending teeth.

13. The assembly of claim 8, wherein the at least one tie bolt extends through the forward drum at a location in the multi-piece disk where hoop stress is equal to radial stress resulting in the multi-piece disk during rotation of the assembly about the central reference axis.

14. The assembly of claim 8, wherein the anti-rotation feature includes an anti-rotation pin that extends radially outward from the floor of the root channel and is configured to engage the root of the turbine blade to block movement of the turbine blade relative to the multi-piece disk about the central reference axis and an anti-rotation pin slot formed in at least one of the plurality of axially-rearwardly extending teeth or the plurality of axially-forwardly extending teeth of the multi-piece disk into which at least a portion of the anti-rotation pin extends.

15. The assembly of claim 14, wherein the anti-rotation pin engages a circumferential face of the root of the turbine blade.

* * * * *